(12) United States Patent
Simpson (10) Patent No.: US 8,528,236 B2
(45) Date of Patent: Sep. 10, 2013

(54) DEVICE FOR CREATING A TRENCH IN A GROUND SURFACE

(75) Inventor: Randy Simpson, Norfolk, NE (US)

(73) Assignee: Schiller Grounds Care, Inc., Southampton, PA (US)

( * ) Notice: Subject to any disclaimer, the term of this patent is extended or adjusted under 35 U.S.C. 154(b) by 351 days.

(21) Appl. No.: 12/960,901

(22) Filed: Dec. 6, 2010

(65) Prior Publication Data

US 2012/0137547 A1    Jun. 7, 2012

(51) Int. Cl.
*A01B 33/02* (2006.01)
(52) U.S. Cl.
USPC ............................................. 37/91
(58) Field of Classification Search
USPC ......... 37/81, 91–94, 189, 190, 347, 352–362, 37/95–97; 172/15–17, 42, 43, 125, 123, 172/548
See application file for complete search history.

(56) References Cited

U.S. PATENT DOCUMENTS

| | | |
|---|---|---|
| 2,034,505 A | 3/1936 | Cline |
| 2,847,924 A | 8/1958 | Quick |
| 2,997,276 A | 8/1961 | Davis |
| 3,580,351 A | 5/1971 | Mollen |
| 4,002,205 A * | 1/1977 | Falk ................................ 172/15 |
| 4,011,913 A | 3/1977 | Davies, III et al. |
| 4,071,922 A | 2/1978 | Davies, III et al. |
| 4,072,195 A | 2/1978 | Carlson |
| 4,224,996 A | 9/1980 | Dobberpuhl |
| 4,255,879 A | 3/1981 | Greider |
| 4,286,670 A | 9/1981 | Ackerman |
| 4,326,592 A | 4/1982 | Stephenson |
| 4,476,643 A | 10/1984 | Hilchey et al. |
| 4,496,150 A | 1/1985 | McGlew |
| 4,511,004 A | 4/1985 | Deneen |
| 4,645,011 A | 2/1987 | Feikema et al. |
| 4,658,910 A | 4/1987 | Garriss |
| 4,696,150 A | 9/1987 | Geeck, III |
| 4,757,885 A | 7/1988 | Kronich |
| 4,825,569 A | 5/1989 | Porter |
| 4,914,840 A | 4/1990 | Porter |
| 4,923,016 A | 5/1990 | Moise |
| 5,139,091 A | 8/1992 | Fujikawa et al. |
| 5,212,896 A | 5/1993 | Hillard et al. |
| 5,226,248 A | 7/1993 | Pollard |
| 5,320,451 A | 6/1994 | Garvey et al. |
| 5,520,253 A | 5/1996 | Kesting |
| 5,542,241 A | 8/1996 | Lydy et al. |
| 5,825,569 A | 10/1998 | Kim et al. |
| 6,079,721 A | 6/2000 | Williford |

(Continued)

*Primary Examiner* — Robert Pezzuto
(74) *Attorney, Agent, or Firm* — Panitch Schwarze Belisario & Nadel LLP (57) ABSTRACT

A device for creating a trench in a ground surface includes a frame, an axle and a platform. A wheel is mounted to the axle and a motor is mounted to the platform. The motor is configured to rotate a drive shaft. A primary blade is removably mountable to the drive shaft. The primary blade has a first radius measured from a geometric center of the primary hub to a free end of a largest of the at least three primary tines. A second blade is removably mountable to the primary hub. The secondary blade has a second radius measured from a geometric center of the secondary hub to a free end of a largest of the at least three secondary tines. The first radius is greater than the second radius. A blade guard is mounted to the platform and generally covers the primary and secondary blades in an assembled configuration.

15 Claims, 8 Drawing Sheets

(56) References Cited

U.S. PATENT DOCUMENTS

| | | |
|---|---|---|
| 6,092,608 A | 7/2000 | Leger |
| 6,367,561 B1 | 4/2002 | Firdaus |
| 6,415,588 B1 | 7/2002 | Kao |
| 6,457,267 B1 | 10/2002 | Porter et al. |
| 6,644,416 B2 | 11/2003 | Teeple |
| 6,651,361 B1 | 11/2003 | Porter et al. |
| 6,854,526 B2 | 2/2005 | Yamazaki et al. |
| 6,874,581 B1 | 4/2005 | Porter et al. |
| 6,904,977 B2 | 6/2005 | Zerrer et al. |
| 7,096,970 B1 | 8/2006 | Porter et al. |
| 7,237,620 B2 | 7/2007 | Abenroth et al. |
| 2004/0149457 A1 | 8/2004 | Yamazaki et al. |
| 2005/0045347 A1 | 3/2005 | Stark et al. |
| 2007/0163789 A1 | 7/2007 | Thackery |

* cited by examiner

DEVICE FOR CREATING A TRENCH IN A GROUND SURFACE

BACKGROUND OF THE INVENTION

The present invention relates generally to a device for creating a trench in a ground surface and, more particularly, a preferred embodiment of the present invention relates to a relatively small, light-weight tiller having at least two spaced-apart blades, each with at least one tine, for creating a trench, defining an edge in the ground surface, and/or laying or burying lines or cables in the ground surface. Each blade is preferably removably mountable to the tiller to aid in replacement of the blades and resulting in a reconfigurable device for defining trenches or edges of different size and/or shape and/or laying or burying wires or cables of different size and/or shape.

Conventional rotary garden tillers typically include one or more tines for breaking, mulching, digging or otherwise tilling soil in rows or beds. Conventional tillers can be difficult to operate due to their relatively large size and various moving parts. The tines of conventional tillers quickly become worn down and require replacement due to the repeated force exerted on the ground surface. Replacing the tines can be an arduous task, since the tines are often located within an interior portion of the tiller and, therefore, are not easily accessible to a user. Furthermore, conventional tillers are generally only capable of digging one size and/or shape of trench because such tillers typically only use a single style or type of tine.

Therefore, it would be desirable to provide a device for creating a trench, defining an edge, and/or laying or burying line or cable in a ground surface that overcomes the above-identified deficiencies. Specifically, it would be desirable to design a tiller that includes two separate, spaced-apart blades that are each removably mountable to the tiller for ease of replacement of either blade and/or to allow a user to selectively control the size and/or type of trench or edge created by the tiller. It would also be desirable to develop a tiller that is capable of laying or burying line or cable beneath the ground surface in addition to creating a trench or an edge in the ground surface. The preferred invention accomplishes the above objectives.

BRIEF SUMMARY OF THE INVENTION

Briefly stated, a preferred embodiment of the present invention is directed to a device for creating a trench in a ground surface. The device includes a frame having a handle, an axle and a platform. A wheel is mounted to the axle and a motor is mounted to the platform. The motor is configured to rotate a drive shaft that includes a proximal end portion, a distal end portion and a mounting flange located near the distal end portion. A primary blade is removably mountable to the drive shaft near the distal end portion of the drive shaft. The primary blade has a primary hub and at least three primary tines extending radially from the primary hub. The primary blade has a first radius measured from a geometric center of the primary hub to a free end of any one of the at least three primary tines. A second blade is removably mountable to the primary hub. The second blade has a secondary hub and at least three secondary tines extending radially from the second hub. The secondary blade has a second radius measured from a geometric center of the secondary hub to a free end of any one of the at least three secondary tines. The first radius is greater than the second radius. A blade guard is mounted to the platform and generally covers the primary and secondary blades in an assembled configuration.

In another aspect, a preferred embodiment of the present invention is directed to a device for creating a trench in a ground surface. The device includes a frame having an axle and a platform. A wheel is mounted to the axle and a motor is mounted to the platform. The motor is configured to rotate a drive shaft that includes a proximal end portion, a distal end portion and a mounting flange located near the distal end portion. A primary blade is removably mountable to the mounting flange. The primary blade has a primary hub and at least one tine extending radially from the primary hub. A second blade is removably mountable to the primary hub. A wide blade guard is removably mountable to the platform in a trenching or edging configuration. A narrow blade guard is separately, removably mountable to the platform in a cable laying configuration. The secondary blade is mounted to the primary hub and the wide blade guard is mounted to the platform in the trenching or edging configuration.

BRIEF DESCRIPTION OF THE SEVERAL VIEWS OF THE DRAWINGS

The following detailed description of the invention will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings.

DETAILED DESCRIPTION OF THE INVENTION

Certain terminology is used in the following description for convenience only and is not limiting. The words "up," "down," "front," "rear," "top," "lower" and "upper" designate directions in the drawings to which reference is made. The words "inwardly" and "outwardly" refer to directions toward and away from, respectively, the geometric center of the device, and designated parts thereof, in accordance with the present invention. Unless specifically set forth herein, the terms "a," "an" and "the" are not limited to one element but instead should be read as meaning "at least one." The terminology includes the words noted above, derivatives thereof and words of similar import.

Referring to the drawings in detail, wherein like numerals indicate like elements throughout, there is shown in FIGS. 1-10 a device, generally designated 10, for creating a trench 12a or edge in soil of a ground surface 12. The device 10 may also be used to break, mulch, dig or otherwise till soil, and/or lay or bury a line or cable 13, such as electrical or cable wire, in the ground surface 12. For example, the device 10 is capable of making a relatively narrow trench (i.e., length significantly greater than width) in the ground surface 12, such as to install dog fencing, low-voltage lighting, drain lines, and irrigation lines (none shown). The device 10 may also be utilized for landscaping, such as creating trenches for stone, mulch, concrete or other types of walls or edging. The device 10 of the present invention may commonly be referred to as a tiller. However, the structure and operation of the device 10 of the present invention is not limited to that of a tiller, as the structure and features described herein have applicability to a wide-range of lawn and land-care devices, such as weed-wackers, aerators, mulchers or edgers.

Referring to FIGS. 1-4 and 8, the device 10 preferably includes a frame 14 for supporting the various structure used to form the trench 12a or laying or burying the cable 13. The frame 14 preferably includes a handle 16 that extends upwardly from the frame 14, an axle 18 and a platform 20. The handle 16 preferably includes at least two segments 16a, 16b that are foldable or pivotable with respect to each other such that the handle 16 can be collapsed or reduced in size for storage or transportation. More particularly, a lower end of an upper segment 16a of the handle 16 is attached to an upper end of a lower segment 16b of the handle 16 by a hinge 17. Thus, the handle 16 is reconfigurable between an extended or operating configuration (FIGS. 1-3) and a folded or storage configuration (not shown). Both the upper and lower segments 16a, 16b of the handle 16 preferably extend generally parallel in both the extended configuration and the folded configuration. To maintain the handle 16 in the extended configuration (FIGS. 1-3), a ring or brace 19 may be moved to surround both a portion of the lower end of the upper segment 16a and a portion of the upper end of the lower segment 16b. To reconfigure the handle 16 to the folded configuration from the extended configuration, the brace 19 may be moved upwardly or downwardly on the handle 16 a sufficient distance until the brace 19 no longer prevents pivoting of the two segments 16a, 16b at the hinge 17.

Figure 2:
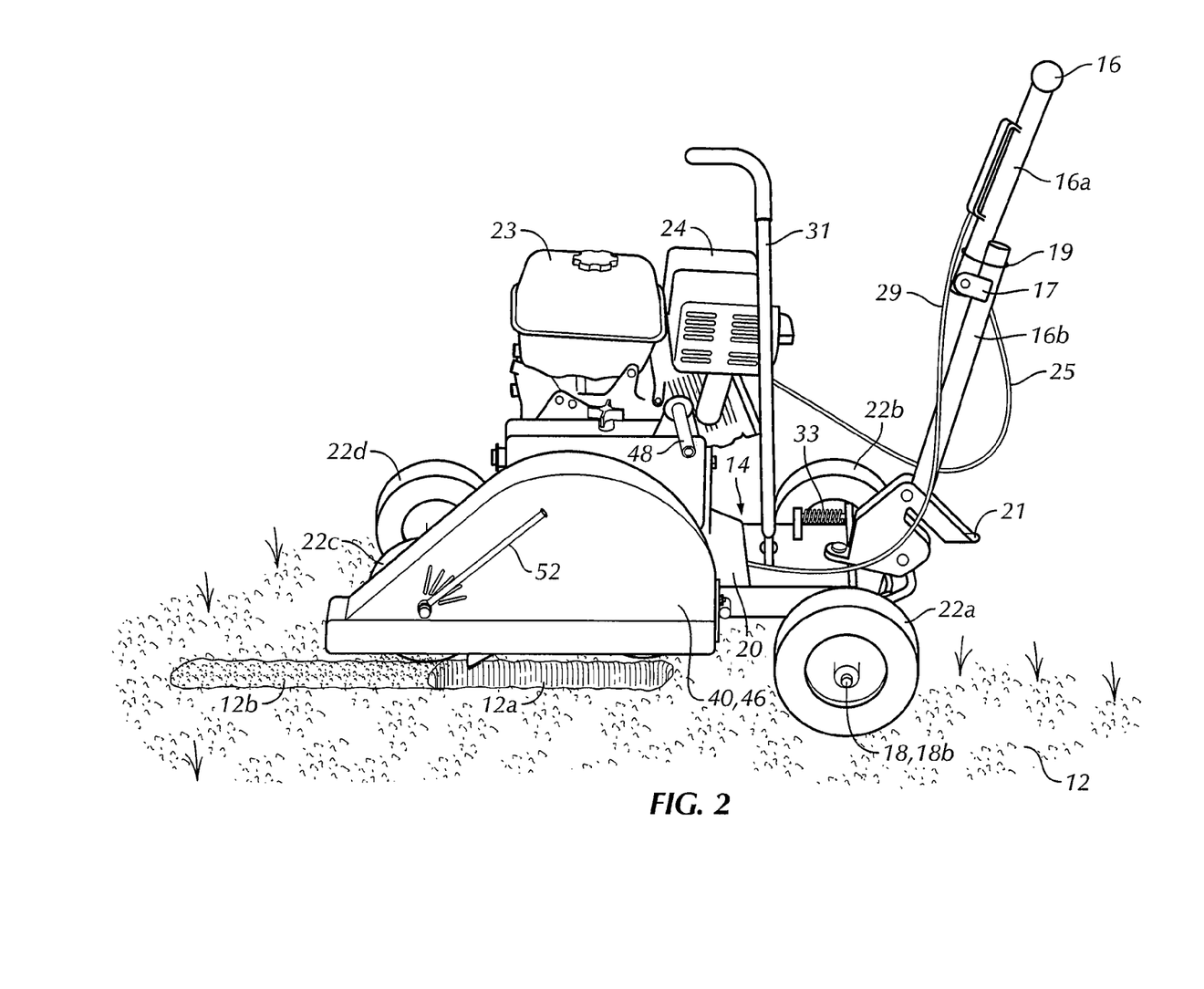
FIG. 2 is a side perspective view of the device of FIG. 1, wherein the device is shown in a cable laying configuration.
Figure 3:
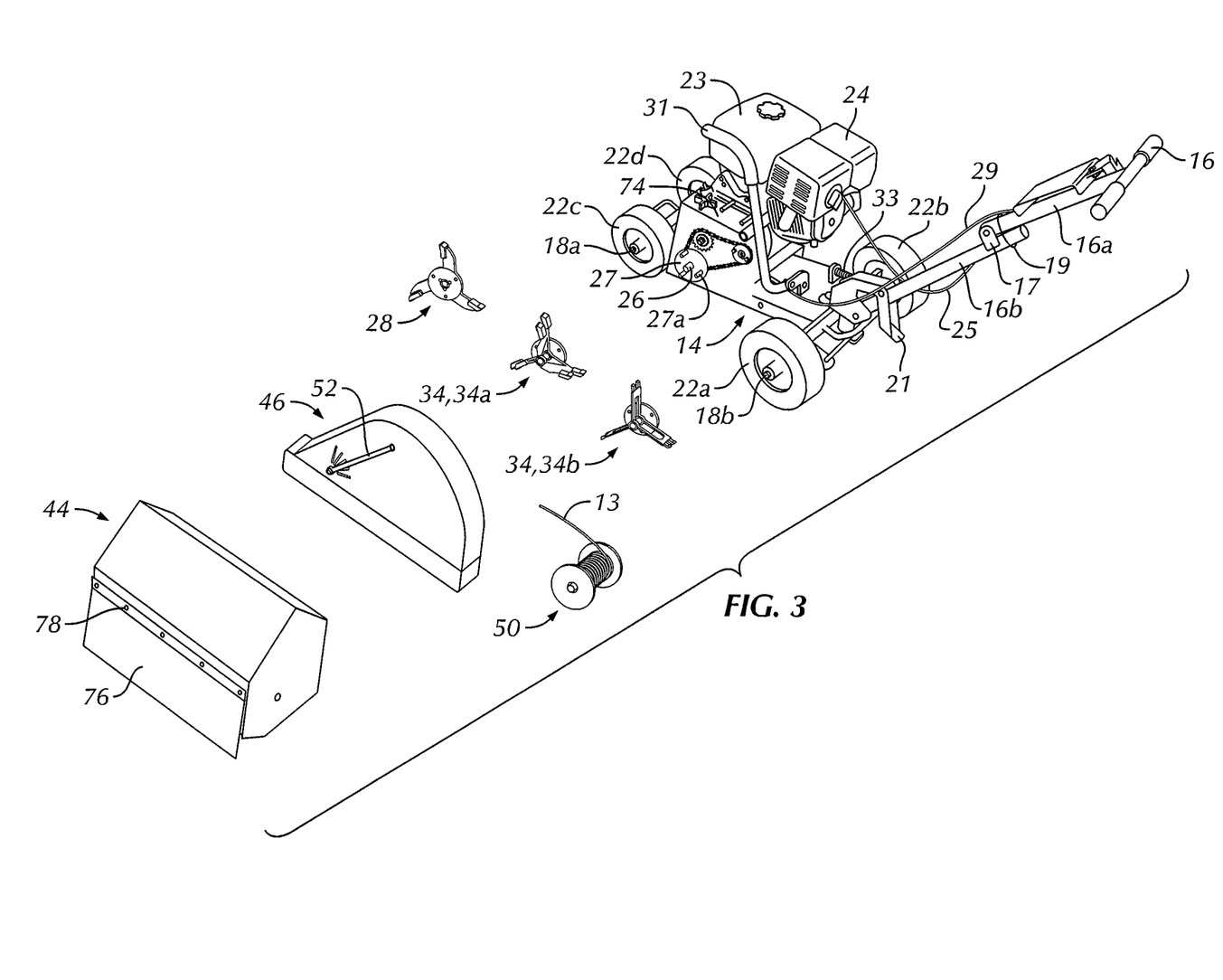
FIG. 3 is a partially exploded top perspective view of the device shown in FIGS. 1 and 2.
Figure 4:
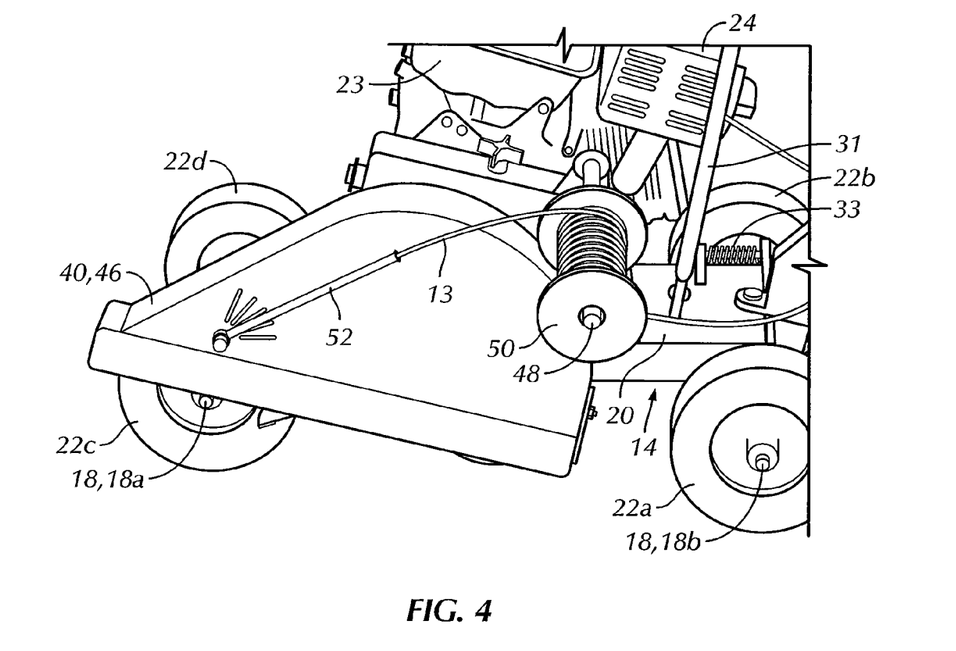
FIG. 4 is a magnified side perspective view of a portion of the device shown in FIG. 2.

As shown in FIGS. 2-4, the axle 18 preferably includes a first or front axle 18a spaced-apart from a second or rear axle 18b. The rear axle 18b is attached to the platform 20 preferably proximate the handle 16 with respect to the front axle 18a. The frame 14 includes at least one and preferably four spaced-apart wheels 22. At least one wheel 22 is preferably mounted to at least one of the axles 18a, 18b. The front and rear axles 18a, 18b are preferably rotatably mounted to the platform 20, but are not so limited and may be fixed to the frame 14 such that the wheels 22 rotate about the axles 18a, 18b. The device 10 preferably includes a first wheel 22a, a second wheel 22b, a third wheel 22c and a fourth wheel 22d, wherein each wheel 22 is preferably mounted to one end of the one of the axles 18a, 18b.

Referring again to FIGS. 1-4, the device 10 preferably includes a motor or engine 24, a fuel tank 23 and a pedal 21, each of which is mounted to the platform 20. The device 10 also preferably includes a throttle cable 25 and a brake cable 29. A tilt position (i.e., angle) of the handle 16 is preferably adjustable by pressing the pedal 21, such as by a foot of a user, and directly moving the handle 16, such as by a hand of the user. The adjustability of the handle 16 is useful since different tilting positions of the handle 16 accommodate, for example, users of different heights. The pedal 21 is preferably formed of two parts (not shown) that are pivotable with respect to one another. A first of the two parts, which is fixedly attached to the platform 20, is at least partially arcuate in shape and includes a plurality of spaced-apart slots (not shown) on an outer or exposed edge thereof. Each slot preferably extends generally parallel with the axle 18. A second of the two parts, which is directly attached to the handle 16, includes a shaft (not shown) removably engagable with any of the slots. By pushing the second part of the pedal 21 (such as with the user's foot), the shaft can be disengaged from any slot and the handle 16 can be moved or pivoted to engage a different slot to change the position or angle of the handle 16.

The handle 16 preferably includes a pivotable, spring-biased control lever (not shown) proximate an upper end of the upper segment 16a that is operatively connected to the throttle cable 25 and the brake cable 29. In turn, the throttle cable 25 is operatively connected to the motor 25 and the brake cable 29 is operatively connected to a brake (not shown). When the control lever is pulled back or engaged, the throttle cable 25 preferably causes the motor 24 to speed up, and the brake cable 29 preferably causes the brake, operatively connected to the rotary blades 28, 24 (described in detail below) underneath or proximate the platform 20, to be released. Alternatively, if the control lever is released or let go, the throttle cable 25 preferably causes the motor 25 to slow down and eventually stop or idle, and the brake cable 29 will preferably activate the brake to stop the rotary blades 28, 34 from turning or rotating.

A clutch (not shown) preferably transfers rotational forces between the motor 25 and the rotary blades 28, 34. The clutch is preferably a centrifugal force clutch that engages and/or disengages based on the speed of the motor 24. Specifically, the clutch includes a gear box (not show) that engages an output or motor shaft 24a of the motor 24 only at certain revolutions per minute (RPMs). Thus, if the motor 24 is moving slowly, no rotational forces are transferred from the motor 24 to the rotary blades. In the event that, for example, the user of the device 10 were to fall down, the control lever would be released, and the throttle cable 25 will cause the motor 24 to slow down. Further, as the speed of the motor 24 decreases, the clutch will disengage the motor 24 from the rotary blades 28, 34 to allow the rotary blades 28, 34 to stop even if the motor 24 has not come to a complete stop. Additionally, the release of the control lever will cause the brake cable 29 to activate the brake to stop the rotary blades 28, 34 from turning or rotating.

Figure 8:
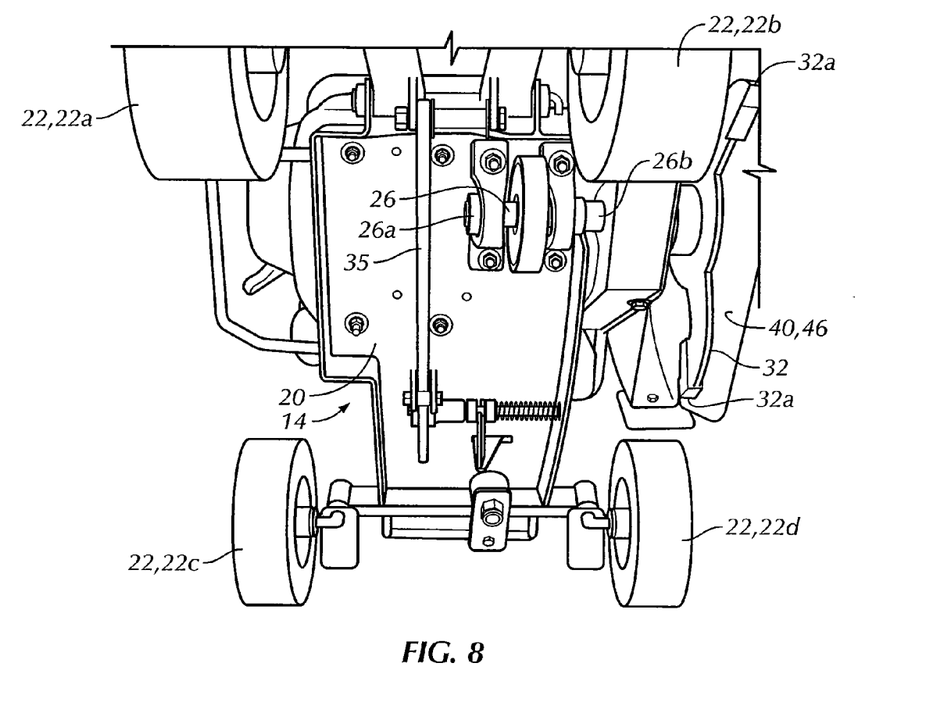
FIG. 8 is a magnified bottom perspective view of a portion of the device shown in FIG. 2.
Figure 9:
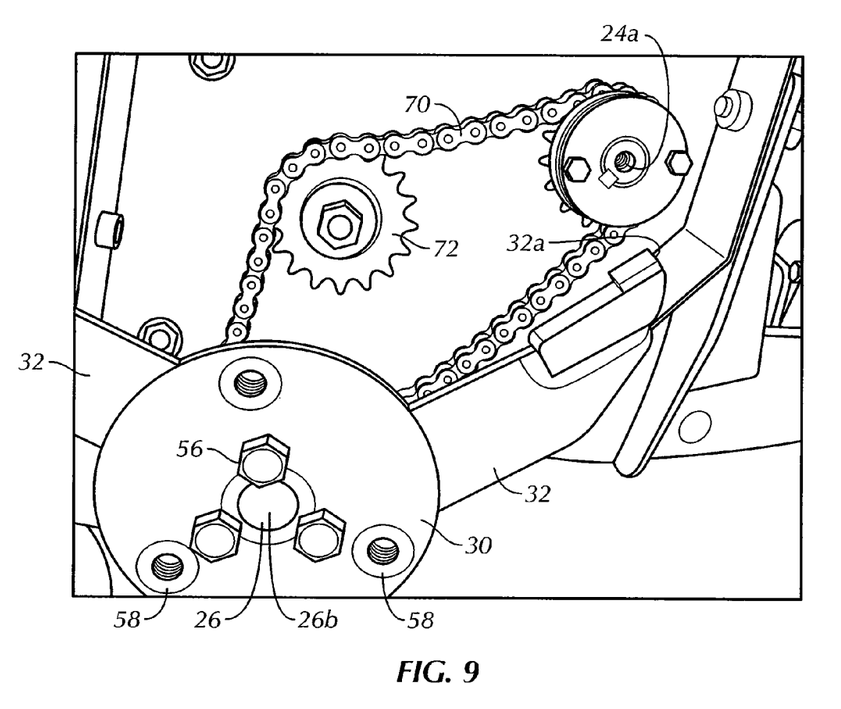
FIG. 9 is a magnified side perspective view of a portion of the device shown in FIGS. 1 and 2, wherein a portion of the first blade is shown attached to a drive shaft.

Referring to FIGS. 8 and 9, the motor 24 preferably includes a motor shaft 24a (FIG. 9) extending outwardly therefrom and rotatably driven by the motor 24. The motor shaft 24a is configured to rotate a drive shaft 26 rotatably mounted to the frame 14. As shown in FIG. 9, a closed-loop chain 70 preferably engages and at least partially surrounds a portion of the motor shaft 24a, a portion of the drive shaft 26 and a portion of an idler gear 72, rotatably mounted on one side of the platform 20. The motor shaft 24a and drive shaft 26 preferably extend at least generally parallel to the front and rear axles 18a, 18b. The drive shaft 26 preferably includes a proximal end portion 26a (FIG. 8), a distal end portion 26b (FIGS. 8 and 9) and a mounting flange 27 (FIG. 3) preferably located near the distal end portion 26b. As shown in FIG. 3, the mounting flange 27 preferably includes one or more spaced-apart projections or prongs 27a.

Figure 5:
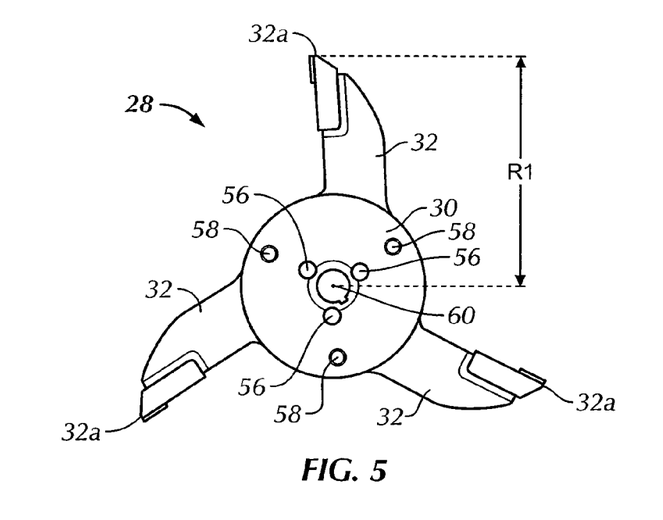
FIG. 5 is a side elevation view of a first blade of the device in accordance with the preferred embodiment of the present invention.

Referring to FIGS. 3, 5-7 and 9, the device 10 includes at least one and preferably three separate rotary blades 28, 34. More particularly, the device 10 preferably includes at least one first or primary blade 28 removably mountable to the drive shaft 26 near the distal end portion 26b thereof. The primary blade 28 has a primary hub 30 and at least one, and preferably at least three, spaced-apart primary tines 32 that extend radially from the primary hub 30. In the preferred embodiment, the primary hub 30 is flat or planar and has a circular outer periphery or circumference, but the primary hub 30 is not limited to such a shape. The primary tines 32 are preferably formed integrally and unitarily with the primary hub 30 and extend from the outer periphery thereof. The primary blade 28 preferably includes a primary axis 60, a first series of mounting holes 56 and a second series of mounting holes 58. The first series of mounting holes 56 are preferably positioned proximate the primary axis 60 and the second series of mounting holes 58 are preferably spaced outwardly relative to the primary axis 60 from the first series of mounting holes 56. Each of the second series of mounting holes 58 is preferably sized and shaped to receive at least a portion of one of the projections 27a of the mounting flange 27 therein. As shown in FIG. 5, the primary blade 28 has a first radius R1 measured from a geometric center of the primary hub 30 (i.e., preferably the primary axis 60) to an exposed or free end 32a of any one of the primary tines 32.

Referring again to FIGS. 3, 5-7 and 9, the device 10 includes at least one and preferably two or more second or secondary (auxiliary) blades 34 removably mounted to the primary hub 30 of the primary blade 28. The inclusion of the removable secondary blades 34 reduces the operating expense of the device 10, because the primary blade 28 can be replaced when damaged or worn-out without having to discard the secondary blades 34. More particularly, as described in more detail below, the device 10 preferably includes at least one secondary blade 34 in the form of a pyramid blade 34a (FIG. 6) and a second or separate secondary blade 34 in the form of a scoop blade 34b (FIG. 7). The secondary blade 34 preferably includes a secondary axis 62 and a third series of mounting holes 64 defined in the secondary hub 36. The third series of mounting holes 64 are preferably aligned with the second series of mounting holes 58 of the primary blade 28 when the primary blade 28 and the secondary blade 34 are attached to the frame 14. Further, the primary and secondary axes 60, 62 are coaxial or aligned when the secondary blade 34 and the primary blade 28 are mounted to the drive shaft 26. Each of the third series of mounting holes 64 is preferably sized and shaped to receive at least a portion of one of the projections 27a of the mounting flange 27 therein.

Figure 6:
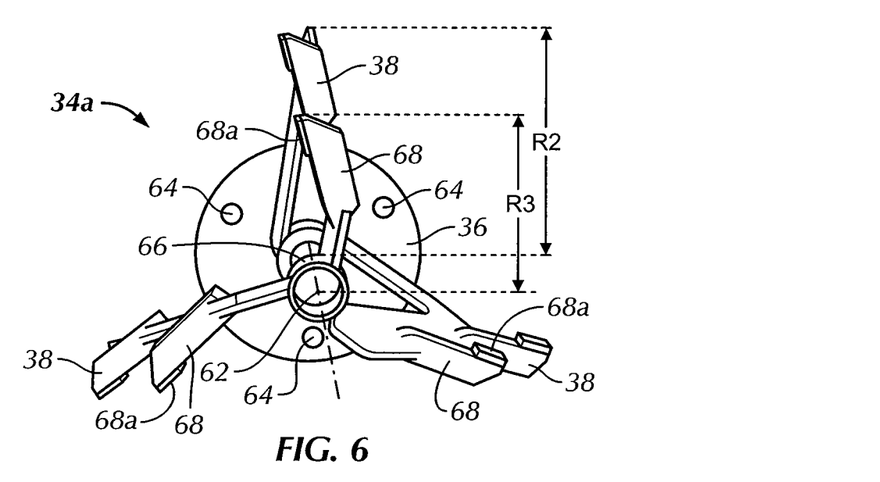
FIG. 6 is a side perspective view of a second blade of the device in accordance with the preferred embodiment of the present invention.
Figure 7:
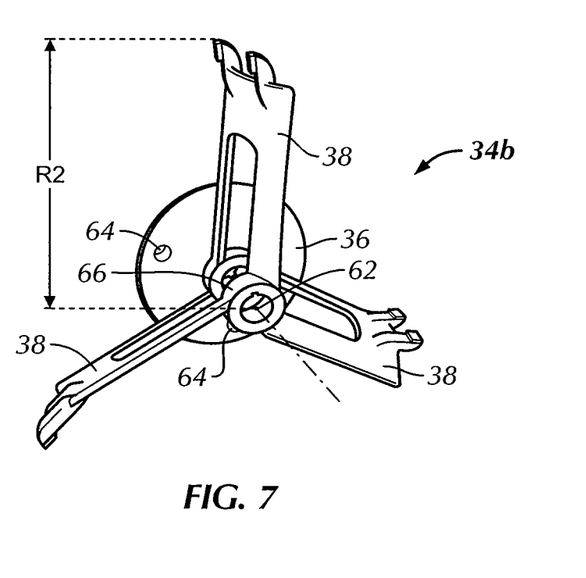
FIG. 7 is a side perspective view of a modified form of the second blade shown in FIG. 6 in accordance with the preferred embodiment of the present invention.

As shown in FIGS. 6 and 7, the secondary blade 34 has a second radius R2 measured from a geometric center of the secondary hub 36 to an exposed or free end 38A of any one of the at least three secondary tines 38. The first radius R1 is preferably greater than the second radius space R2. The difference in radius between the primary blade 28 and the secondary blade 34 protects or preserves the secondary blade 34 during operation of the device 10, such that the secondary tines 38 absorb less of the forces created during operation of the device 10 than do the primary tines 32, as the primary tines 32 typically impact the ground surface 12 and break-up the ground surface 12 before impact of the secondary tines 38 or more frequently than the secondary tines 38.

Referring to FIG. 6, the secondary blade 34 or pyramid blade 34a includes a distal hub 66 spaced-apart from and fixed relative to the secondary hub 36. A gap or spacing preferably exists between the secondary hub 36 and the distal hub 66. At least one and preferably three spaced-apart distal tines 68 preferably extend radially outwardly from the distal hub 66. As shown in FIG. 6, the distal tines 68 each define a third radius R3 measured from a geometric center of the distal hub 66 to an exposed or free end 68a of any one of the three distal tines 68. The second radius R2 is preferably greater than the third radius R3. The difference in radius between the secondary tines 38 and the distal tines 68 preferably results in a sloped trench (i.e., pyramid shape) during operation of the device 10.

Referring to FIG. 7, the secondary blade 34 may also comprise the scoop blade 34b, which also preferably includes a distal hub 66 spaced-apart from and fixed relative to the secondary hub 36. The secondary tines 38 of the scoop blade 34b are preferably angled relative to an imaginary plane extending generally perpendicularly to the secondary axis 62, such that the scoop blade 34b urges soil away from the primary blade 28 and out of the trench 12a during operation of the device 10. In other words, each secondary tine 38 defines a plane that is angled, such as by approximately fifteen to forty-five degrees (15-45°), with respect to a plane defined by the generally flat or planar secondary hub 36.

As shown in FIGS. 1-4, the device 10 preferably includes a lift arm 31 pivotally attached to the platform 20 for raising and/or lowering the rotary blades 28, 34 with respect to the ground surface 12. The lift arm 31 preferably extends outwardly and upwardly from the platform 20 above the engine 24 and the fuel tank 23. A rotary knob (not shown), which is operatively connected to a biasing member 33, such as a coil spring, attached to the platform 20 is manually actuable by a user to set the desired height of the rotary blades 28, 34 with respect to the ground surface 12. A lock arm 35 (FIG. 8) positioned beneath the platform 20 is operatively engaged with the rotary knob and biasing member 33 to generally releasably lock the rotary blades 28, 23 and/or platform 20 at a desired height above the ground surface 12.

In operation, when a user desires to modify the height of the rotary blades 28, 34 above the ground surface 12, a user moves or pivots the lift arm 31, which in turn releases the lock arm 35 to move to a predetermined position set by the rotary knob 33. When the lock arm 35 is released, the rear wheels 22a, 22b will be moved in a first or outward direction away from the platform 20 and motor 24, and when the handle 16 is pivoted or angled toward a vertical position, the rear wheels 22a, 22b will move in a second or inward direction toward the platform 20 and motor 24. The above-described movement raises and/or lowers the rotary blades 28, 34 above the ground surface 12 by the tilting action caused by the raising and/or lowering of the front portion of the device 10. The total height adjustment of the device 10 that can be made for the rotary blades 28, 34 is preferably approximately five inches (5"), but the adjustment may be modified to a greater or lesser height.

Referring to FIGS. 1-4, 8 and 10, the device 10 includes at least one and preferably two or more separate blade guards or covers 40 that are each removably mountable directly to the platform 20. Specifically, it is preferred the device 10 includes a wide blade guard 44 (FIGS. 1, 3 and 10) removably mountable to the platform 20 and a narrow blade guard 46 (FIGS. 2-4) separately and independently removably mountable to the platform 20. Each blade guard 44, 46 is preferably formed of a generally rigid, high-strength, light-weight material, such as a metal alloy, and both blade guards 44, 46 generally define a cavity to enclose and/or cover at least one of the rotary blades 28, 34 in the assembled configuration of the device 10. More particularly, the wide blade guard 44 generally covers, encloses and/or surrounds both the primary and secondary blades 28, 34 in an assembled configuration of the device 10. Thus, the secondary blade 34 is preferably mounted to the primary hub 30 of the primary blade 28 and the wide blade guard 44 is preferably mounted to the platform 20 in a trenching or edging configuration (FIG. 1) of the device 10. In contrast, it is preferred that only the primary blade 28 is mounted to the device 10 and the narrow blade guard 46 is mounted to the platform 20 in a cable laying configuration (FIGS. 2 and 8) of the device 10. Thus, the narrow blade guard 46 is narrower or has a smaller width than the wide blade guard 46. As shown in FIG. 3, the platform 20 preferably includes a guard mounting wall 74. The wide blade guard 44 and the narrow blade guard 46 are each preferably fixed or attached directly to the guard mounting wall 74 in an assembled configuration of the device 10.

Figure 1:
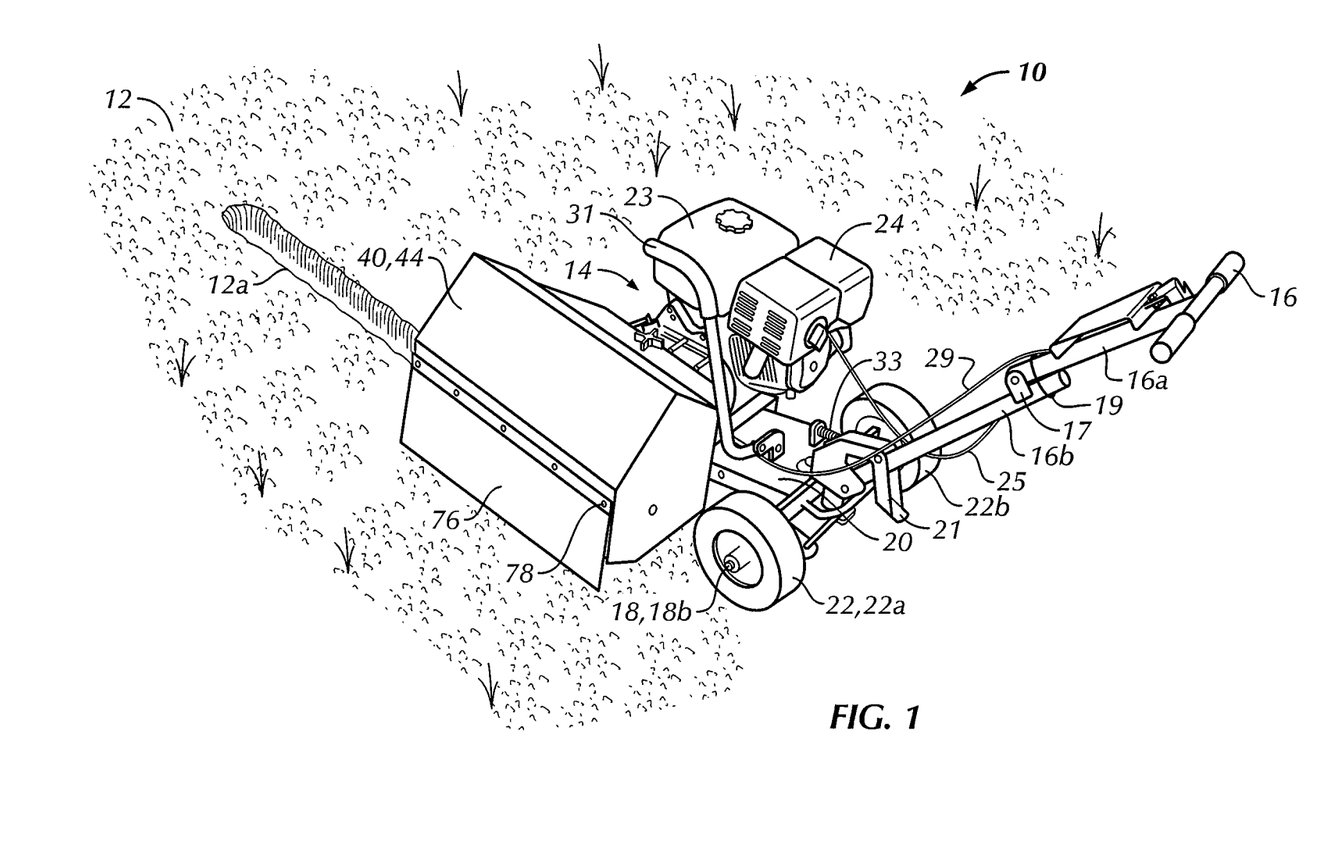
FIG. 1 is a top perspective view of a device for creating a trench in a ground surface in accordance with a preferred embodiment of the present invention, wherein the device is shown in a trenching or edging configuration.
Figure 10:
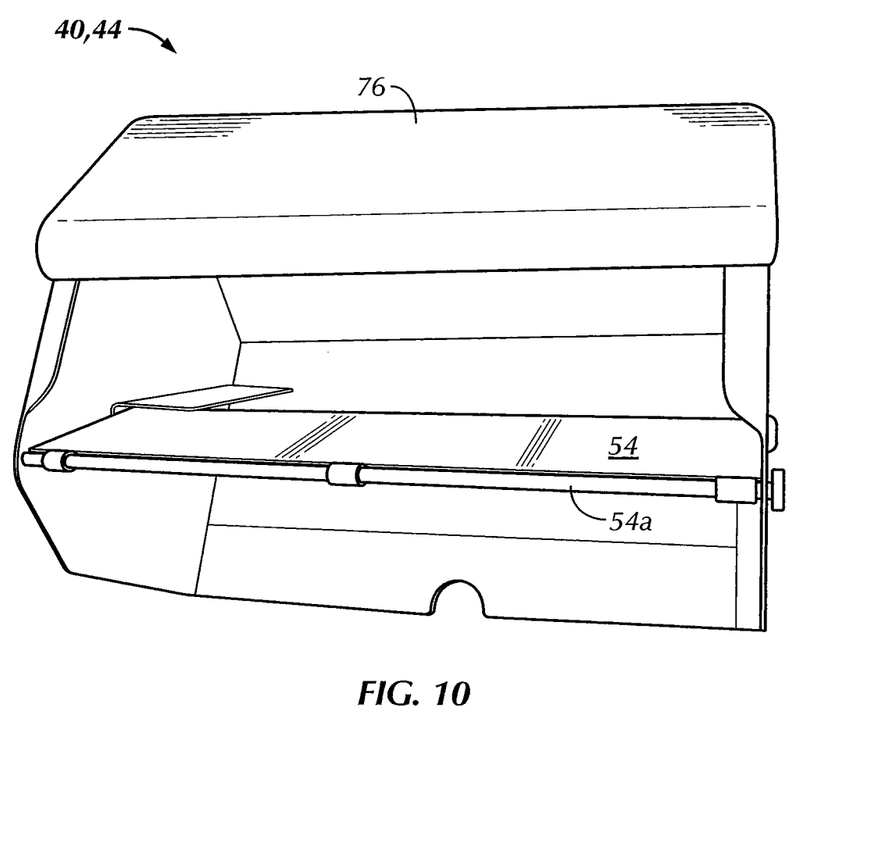
FIG. 10 is a magnified bottom perspective view of a wide blade guard of the device of the preferred embodiment shown in FIGS. 1 and 3.

As shown in FIGS. 1, 3 and 10, the wide blade guard 44 preferably includes a flap or door 76 on an outer or exposed side thereof. The flap 76 is preferably formed of a generally flexible, light-weight material, such as a flexible elastomeric material. A top edge of the flap 76 is preferably fixedly attached to a portion of the wide blade guard 44, such as by one or more spaced-apart screws or rivets 78, and a remainder of the flap 76 is free or not secured to the wide blade guard 44. The flap 76 provides access to the cavity of the wide blade guard 44 when the wide blade guard 44 is attached to the platform 20. The flap 76 also allows soil from the trench 12a to be thrown or ejected away from the trench 12a, while making sure that the soil does not fly upwardly from the ground surface 12 or back into the trench 12a.

Referring to FIGS. 2 and 4, the frame 14 of the device 10 preferably includes a spool post 48 for receiving a cable spool 50 (FIG. 4). The cable 13 is preferably wrapped around the cable spool 50 in a generally compact manner. As shown in FIGS. 2-4, the narrow blade guard 46 preferably includes a cable tube 52 for directing the cable 13 from the cable spool 50 into the trench 12a during operation of the device 10. The spool post 48 is preferably fixed to a portion of the frame 14 and the cable spool 50 may be rotatably attached to the spool post 48. Alternatively, the spool post 48 may be rotatably attached to the frame 14 and rotated by the motor 24. The narrow blade guard 46 preferably has a generally hollow, half-pear or arcuate-shaped body portion generally covering the primary blade 28 in the cable laying configuration (FIG. 2). The shape of the body portion of the narrow blade guard 46 encourages soil to be moved from a rear of the narrow blade guard 46 to a front of the narrow blade guard 46 during operation of the device 10.

The cable tube 52 is preferably pivotably or movably mounted to an outer or exposed lateral sidewall of the body portion of the narrow blade guard 46, such that the cable tube 52 is pivotable between a first or generally vertical position and a second or generally horizontal position. The cable tube 52 is adjustable to allow a user to determine the angle at which the cable 13 is laid or placed in the trench 12a. The half-pear shaped body portion preferably directs soil of the ground surface 12 into the trench 12a and on top of the cable 13 during operation of the device 10. In operation, the cable spool 50 rotates (i.e., in a counterclockwise direction) to release or extend the cable 13 from the cable tube 52. The user preferably stands at the handle 16 and pulls the device 10 toward themselves (i.e., the wheels 22 rotate in a clockwise direction in FIG. 2) A free end of the cable 13 is extended through the cable tube 52 and into the trench 12a behind the rotary blades 28, 34 (i.e., proximate the third and fourth wheels 22c, 22d with respect to the rotary blades 28, 34). In other words, once the rotary blades 28, 34 have dug or created the trench 12a, the cable 13 is laid or placed into the bottom of the trench 12a and soil is thrown or deposited back over the cable 12 due to the half-pear shaped body portion of the narrow blade guard 46.

Referring to FIG. 10, the wide blade guard 44 preferably includes a deflecting wall 54 laterally spaced-apart from the platform 20 in the trenching or edging configuration (FIG. 1) of the device 10. The deflecting wall 54 is preferably configured to deflect soil from the trench 12a to a side edge of the trench 12a spaced-apart from the platform 20 in operation of the device 10. A lower edge of the deflecting wall 54 is preferably attached to a rod or shaft 54a that extends from a front wall of the wide blade guard 44 to a rear wall of the wide blade guard 44. The deflecting wall 54 essentially divides the wide blade guard 44 into two halves or portions, such that one half is directly over the trench 12a in the trenching or edging configuration (FIG. 1) of the device 10 and soil is thrown or sent upwardly over the deflecting wall 54 and then downwardly into the other half, which is preferably spaced-apart from the trench 12a.

From the foregoing, it is apparent that the present invention is directed to a device for creating a trench in a ground surface. The preferred device is adaptable for use with different blades and guards for performing various maintenance operations, particularly various ground tilling operations. It will be appreciated by those skilled in the art that changes could be made to the preferred embodiment described above without departing from the broad inventive concepts thereof. It is understood, therefore, that this invention is not limited to the particular embodiment disclosed, but it is intended to cover all modifications within the spirit and scope of the present invention as defined by the appended claims.

I claim:

1. A device for creating a trench in a ground surface, the device comprising:
    a frame having a handle, an axle and a platform;
    a wheel mounted to the axle to at least partially support the frame for movement on the ground surface;
    a motor mounted to the platform, the motor configured to rotate a drive shaft, the drive shaft including a proximal end portion, a distal end portion and a mounting flange located near the distal end portion;
    a primary blade removably mountable to the drive shaft near the distal end portion of the drive shaft, the primary blade having a primary hub and at least three primary tines extending radially from the primary hub, the primary blade having a first radius measured from a geometric center of the primary hub to a free end of any one of the at least three primary tines;
    a secondary blade removably mountable to the primary hub, the secondary blade having a secondary hub and at least three secondary tines extending radially from the secondary hub, the secondary blade having a second radius measured from a geometric center of the secondary hub to a free end of any one of the at least three secondary tines, the first radius being greater than the second radius; and
    a blade guard mounted to the platform and generally covering the primary and secondary blades in an assembled configuration.

2. The device of claim 1 wherein the primary blade includes a primary axis, a first series of mounting holes and a second series of mounting holes, the first series of mounting holes positioned proximate the primary axis and the second series of mounting holes spaced outwardly relative to the primary axis from the first series of mounting holes.

3. The device of claim 2 wherein the secondary blade includes a secondary axis and a third series of mounting holes defined in the secondary hub, the third series of mounting holes aligned with the second series of mounting holes and the primary and secondary axes being coaxial when the secondary blade and the primary blade are mounted to the drive shaft.

4. The device of claim 1 wherein the secondary blade includes a pyramid blade and a scoop blade.

5. The device of claim 4 wherein the secondary hub of the pyramid blade includes a third series of mounting holes therein, a secondary axis, a distal hub spaced-apart from and fixed to the secondary hub, at least three distal tines extending radially outwardly from the distal hub, the distal tines defining a third radius measured from a geometric center of the distal hub to a free end of any one of the at least three distal tines, the second radius being greater than the third radius.

6. The device of claim 4 wherein the secondary hub of the scoop blade includes a third series of mounting holes therein, a secondary axis, a distal hub spaced-apart from and fixed to the secondary hub, the secondary tines angled relative to an imaginary plane extending generally perpendicularly to the secondary axis such that the scoop blade urges the soil away from the primary blade and out of the trench in operation.

7. The device of claim 6 wherein the blade guard is comprised of a wide blade guard configured to urge soil of the ground surface removed from the trench to a side of the trench away from the platform in operation.

8. The device of claim 1 wherein the blade guard comprises a wide blade guard.

9. The device of claim 1 wherein the axle is comprised of a front axle and a rear axle and the wheel is comprised of first, second, third and fourth wheels, the front and rear axles mounted to the platform.

10. A device for creating a trench in a ground surface, the device comprising:
a frame having an axle and a platform;
a wheel mounted to the axle to at least partially support the frame for movement on the ground surface;
a motor mounted to the platform, the motor configured to rotate a drive shaft, the drive shaft including a proximal end portion, a distal end portion and a mounting flange located near the distal end portion;
a primary blade removably mountable to the mounting flange, the primary blade having a primary hub and at least one tine extending radially from the primary hub; and
a secondary blade removably mountable to the primary hub;
a wide blade guard removably mountable to the platform in a trenching or edging configuration; and
a narrow blade guard separately and removably mountable to the platform in a cable laying configuration, the secondary blade mounted to the primary hub and the wide blade guard mounted to the platform in the trenching or edging configuration.

11. The device of claim 10 wherein the secondary blade is comprised of a pyramid blade and a scoop blade.

12. The device of claim 10 wherein the narrow blade guard includes a spool post for receiving a cable spool and a cable tube for directing a cable from the spool into the trench during operation, the narrow blade guard having a generally hollow, half-pear shape portion generally covering the primary blade in the cable laying configuration, the half-pear shape portion directing soil of the ground surface into the trench and onto the cable in operation.

13. The device of claim 7 wherein the wide blade guard includes a deflecting wall spaced from the platform in the trenching or edging configuration, the deflecting wall configured to deflect soil from the trench to an edge of the trench spaced-apart from the platform in operation.

14. The device of claim 7 wherein the platform includes a generally planar guard mounting wall, the wide blade guard and the narrow blade guard fixed to the guard mounting wall in an assembled configuration.

15. The device of claim 12 wherein the spool post is rotatably driven by the motor.

* * * * *